（12） United States Patent
Gieras et al.

(10) Patent No.: US 10,715,017 B2
(45) Date of Patent: Jul. 14, 2020

(54) HYBRID SYNCHRONOUS MACHINES

(71) Applicant: Hamilton Sundstrand Corporation, Charlotte, NC (US)

(72) Inventors: Jacek F. Gieras, Glastonbury, CT (US); Gregory I. Rozman, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 362 days.

(21) Appl. No.: 15/612,825

(22) Filed: Jun. 2, 2017

(65) Prior Publication Data

US 2018/0351440 A1 Dec. 6, 2018

(51) Int. Cl.
| | | |
|---|---|---|
| *H02K 21/04* | (2006.01) | |
| *H02K 1/27* | (2006.01) | |
| *H02K 11/01* | (2016.01) | |
| *H02K 21/16* | (2006.01) | |
| *H02K 1/02* | (2006.01) | |

(52) U.S. Cl.
CPC .......... *H02K 21/046* (2013.01); *H02K 1/276* (2013.01); *H02K 1/2746* (2013.01); *H02K 1/2766* (2013.01); *H02K 11/01* (2016.01); *H02K 1/02* (2013.01); *H02K 1/274* (2013.01); *H02K 21/16* (2013.01)

(58) Field of Classification Search
CPC .... H02K 1/276; H02K 1/2746; H02K 1/2766; H02K 21/046
See application file for complete search history.

(56) References Cited

U.S. PATENT DOCUMENTS

| 3,743,873 A | 7/1973 | de Jong | |
|---|---|---|---|
| 5,682,073 A | 10/1997 | Mizuno | |
| 5,731,647 A * | 3/1998 | Schuller | H02K 1/2746 |
| | | | 310/114 |
| 7,518,278 B2 * | 4/2009 | Hsu | H02K 1/2766 |
| | | | 310/156.53 |
| 7,719,153 B2 * | 5/2010 | Hsu | H02K 21/046 |
| | | | 310/156.53 |
| 7,932,658 B2 * | 4/2011 | Ionel | H02K 1/2766 |
| | | | 310/156.33 |

(Continued)

FOREIGN PATENT DOCUMENTS

| EP | 0620634 A1 | 10/1994 |
|---|---|---|
| EP | 2528198 A2 | 11/2012 |

OTHER PUBLICATIONS

Extended European Search Report dated Oct. 5, 2018, issued during the prosecution of corresponding European Patent Application No. EP 18175831.9 (8 pages).

(Continued)

*Primary Examiner* — Jeremy A Luks
(74) *Attorney, Agent, or Firm* — Locke Lord LLP; Scott D. Wofsy; Judy R. Naamat (57) ABSTRACT

A rotor has a ferromagnetic body with a surface and magnetic poles arranged about a rotation axis. One or more of the magnetic poles has a first magnetic flux barrier and a second magnetic flux barrier. The first magnetic flux barrier is arranged radially between the rotation axis and the surface of the ferromagnetic body. The second magnetic flux barrier is arranged radially between the first magnetic flux barrier and the surface of the ferromagnetic body.

16 Claims, 8 Drawing Sheets

(56) References Cited

U.S. PATENT DOCUMENTS

| | | | | |
|---|---|---|---|---|
| 8,018,111 | B2* | 9/2011 | Kinjou | H02K 21/14 310/156.53 |
| 8,866,359 | B2* | 10/2014 | Li | H02K 21/16 310/156.45 |
| 9,083,219 | B2* | 7/2015 | Choi | H02K 1/2773 |
| 9,853,509 | B2* | 12/2017 | Fujisawa | H02K 1/2766 |
| 9,893,581 | B2* | 2/2018 | Kikuchi | H02K 1/2766 |
| 10,056,792 | B2* | 8/2018 | Rahman | H02K 1/02 |
| 10,135,308 | B2* | 11/2018 | Dorfstatter | H02K 15/03 |
| 2003/0173853 | A1 | 9/2003 | Knauff et al. | |
| 2015/0115758 | A1* | 4/2015 | Koka | B60L 50/51 310/156.07 |
| 2015/0229170 | A1* | 8/2015 | Koechlin | H02K 1/2766 310/156.53 |
| 2016/0329845 | A1* | 11/2016 | Jannot | H02K 1/2766 |
| 2017/0040855 | A1* | 2/2017 | Saint-Michel | H02K 1/2766 |
| 2017/0187257 | A1* | 6/2017 | Liu | H02K 1/02 |
| 2017/0294813 | A1* | 10/2017 | Lim | H02K 1/146 |
| 2018/0145552 | A1* | 5/2018 | Hattori | H02K 1/2766 |
| 2018/0219438 | A1* | 8/2018 | Oikawa | H02K 1/27 |
| 2018/0254677 | A1* | 9/2018 | Shibamori | H02K 21/16 |

OTHER PUBLICATIONS

J.F. Gieras, "PM synchronous generators with hybrid excitation system and voltage control capabilities: a review," International Conference on Electrical Machines ICEM 2012, Marseille, France, 2012, pp. 2571-2577.

J.A. Tapia, F. Leonardi, T.A. Lipo, "Consequent-pole permanent-magnet machine with extended field weakening capability," IEEE Transactions on Industry Applications, vol. 39, 2003, No. 6, pp. 1704-1709.

* cited by examiner

HYBRID SYNCHRONOUS MACHINES

BACKGROUND OF THE INVENTION

1. Field of the Invention

The present disclosure relates to synchronous machines, and more particularly to hybrid synchronous machines having permanent magnets and field windings.

2. Description of Related Art

Electrical systems commonly utilize generators to produce electrical power for various devices connected to the electrical system. The generator produces electrical power by communicating magnetic flux between the generator rotor and the stator, the magnetic flux inducing a flow of electric current in the stator windings. The electric current induced in the generator stator is applied to the electrical system at a voltage which corresponds to the rotational speed of the generator rotor. Variation in the electrical load connected to the generator can also influence the generator output voltage.

In some electrical systems, such as aircraft, automobiles, wind turbines, microturbines, etc., constant-voltage electrical power is required over a range of rotor rotational speeds and/or electrical loads. To accommodate the need for constant voltage output generators commonly employ wound-field or permanent magnet (PM) architectures with magnetic flux density control. In wound-field generators magnetic flux density in the air gap is generally controlled by a field excitation current applied to the generator rotor. In PM generator architectures magnetic flux density is generally controlled by d-axis stator (armature) current, typically through the use of a solid state converter.

Such conventional generator architectures have generally been considered satisfactory for their intended purpose. However, there is still a need in the art for improved generator architectures. The present disclosure provides a solution for this need.

SUMMARY OF THE INVENTION

A rotor has a ferromagnetic body with a surface and magnetic poles arranged about a rotation axis. One or more of the magnetic poles has a first magnetic flux barrier and a second magnetic flux barrier. The first magnetic flux barrier is arranged radially between the rotation axis and the surface of the ferromagnetic body. The second magnetic flux barrier is arranged radially between the first magnetic flux barrier and the surface of the ferromagnetic body.

In certain embodiments, the rotor can be sleeveless, i.e., without a non-ferromagnetic retaining sleeve to protect permanent magnets (PMs) against centrifugal stresses. The rotor can include a plurality of sheet members stacked along the rotation axis and laminated to one another. The rotor can include a soft magnetic composite (SMC) material. The sheet members or SMC material can define the surface of the ferromagnetic body. The ferromagnetic body can define axially extending slots within the body interior. The slots can be bounded by the sheet members or SMC material. The first magnetic flux barrier can be housed within an axial slot. The second magnetic flux barrier can be housed within one or more of the axial slots.

In accordance with certain embodiments, the first and second magnetic flux barriers can be arranged within a common pole. The common pole can be circumferentially bounded by a pole without a magnetic flux barrier. The common pole can axially overlap a magnetic pole without a magnetic flux barrier. The second magnetic flux barrier can radially overlap the first magnetic flux barrier. A portion of the ferromagnetic body can radially overlap the first and second magnetic flux barriers. The first magnetic flux barrier can be defined by an empty axial slot. The first magnetic flux barrier can be defined by an axial slot containing a nonmagnetic material. It is contemplated that the second magnetic flux barrier can include one or more axial slots containing a permanent magnet (PM).

It is also contemplated that, in accordance with certain embodiments, the PM can have an axial profile with major and minor dimensions. The major dimension can extend radially between the rotation axis and the surface of the ferromagnetic body. The major dimension can be tangent relative to an interior circumference of the ferromagnetic body. The major dimension can be arranged such that the major dimension has both radial and tangential components. It is contemplated that the PM profile can have an arcuate shape. The major dimension of the arcuate shape can be tangent relative to an interior circumference of the ferromagnetic body.

A synchronous machine includes a stator arranged along a rotation axis and a rotor as described above supported for rotation relative to the stator. The first magnetic flux barrier includes an empty axial slot or an axial slot containing a nonmagnetic material. The second magnetic flux barrier includes one or more PM and radially overlaps the first magnetic flux barrier in a common pole.

In certain embodiments the stator has a control coil. The control coil can extend circumferentially about the rotor. The common pole can be arranged axially on a single side of the control coil. The common pole can be circumferentially adjacent to a pole without magnetic flux barriers. The common pole can axially overlap a pole without magnetic flux barriers.

A method of making a rotor includes forming a ferromagnetic body with a surface and magnetic poles arranged about a rotation axis. A first slot is defined in a magnetic pole between the surface and the rotation axis for a first magnetic flux barrier. A second slot is defined in the magnetic pole between the first slot and the surface for a second magnetic flux barrier.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
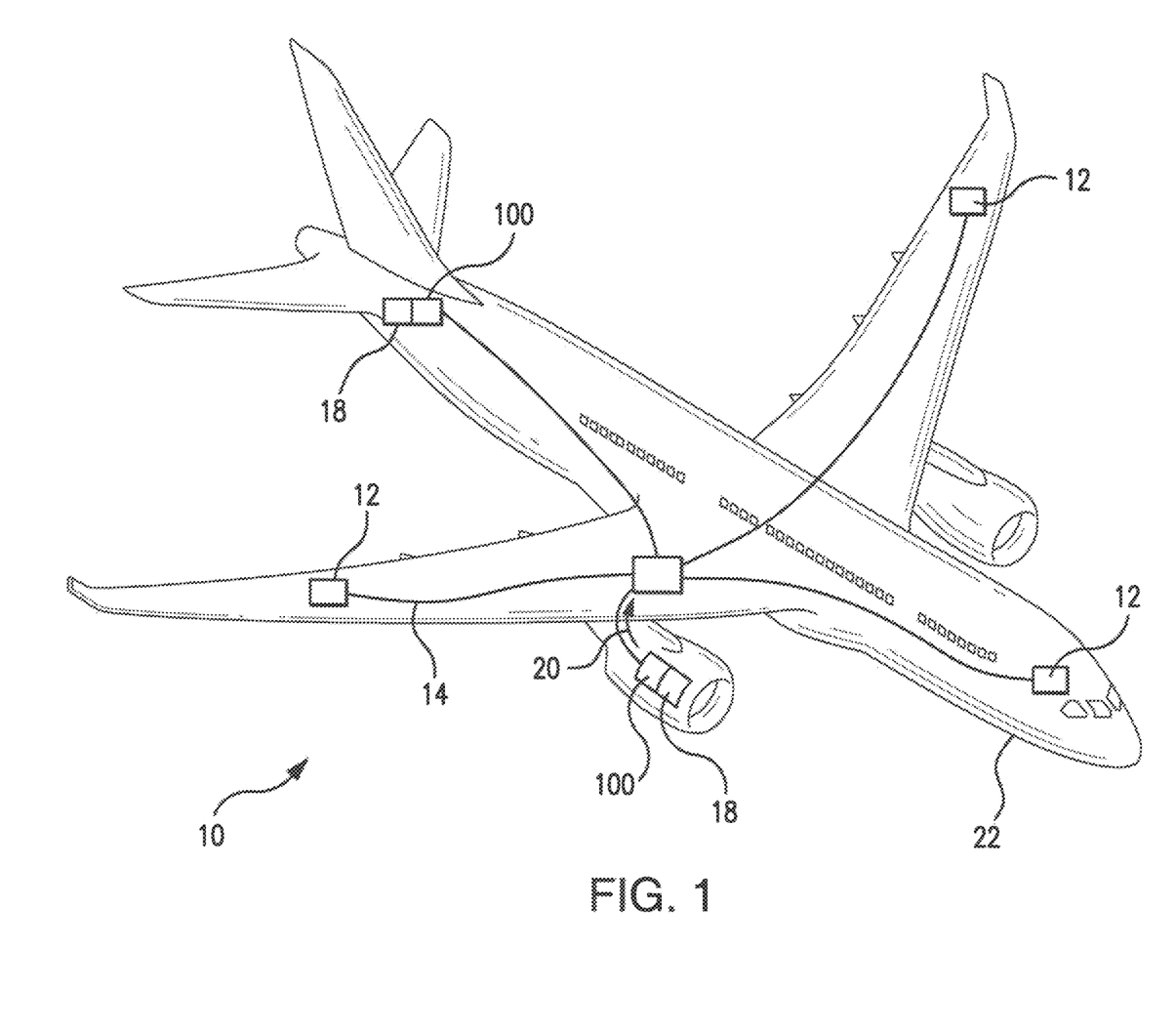
FIG. 1 is a schematic view of an exemplary embodiment of an aircraft electrical system constructed in accordance with the present disclosure, showing synchronous machines providing electrical power to electrical devices connected to the electrical system.

Reference will now be made to the drawings wherein like reference numerals identify similar structural features or aspects of the subject disclosure. For purposes of explanation and illustration, and not limitation, a partial view of an exemplary embodiment of a synchronous machine in accordance with the disclosure is shown in FIG. 1 and is designated generally by reference character 100. Other embodiments of synchronous machines, rotors for synchronous machines, and methods of making rotors in accordance with the disclosure, or aspects thereof, are provided in FIGS. 2-8, as will be described. The systems and methods described herein can be used for permanent magnet (PM) generators with hybrid excitation, such as in aircraft electrical systems, though the present disclosure is not limited to aircraft electrical systems in general.

Referring to FIG. 1, an aircraft electrical system 10 is shown. Electrical system 10 includes synchronous machine 100, a plurality of power-consuming devices 12, and a power distribution bus 14. Power distribution bus 14 connects power-consuming devices 12 to synchronous machine 100. Synchronous machine 100 is a generator with hybrid excitation arranged to receive variable-speed rotational energy 16 (shown in FIG. 2) from a rotation source 18 and generate constant voltage output power 20 using rotational energy 16, which synchronous machine 100 provides to one or of the power-consuming devices 12 connected to synchronous machine 100 through power distribution bus 14.

In the illustrated exemplary embodiment electrical system 10 is an aircraft electrical system carried by an aircraft 22. Rotation source 18 is a gas turbine engine, such as an aircraft main engine mounting synchronous machine 100, or an auxiliary power unit (APU) located in the tail of the aircraft with a dedicated gas turbine engine operably connected to synchronous machine 100, and constant voltage output power 20 is alternating current (AC) generated by synchronous machine 100, as will be described. Although described herein as a generator-type synchronous machine with hybrid excitation, it is to be understood and appreciated that motors and stator/motor electrical machines will also benefit from the present disclosure.

Figure 2:
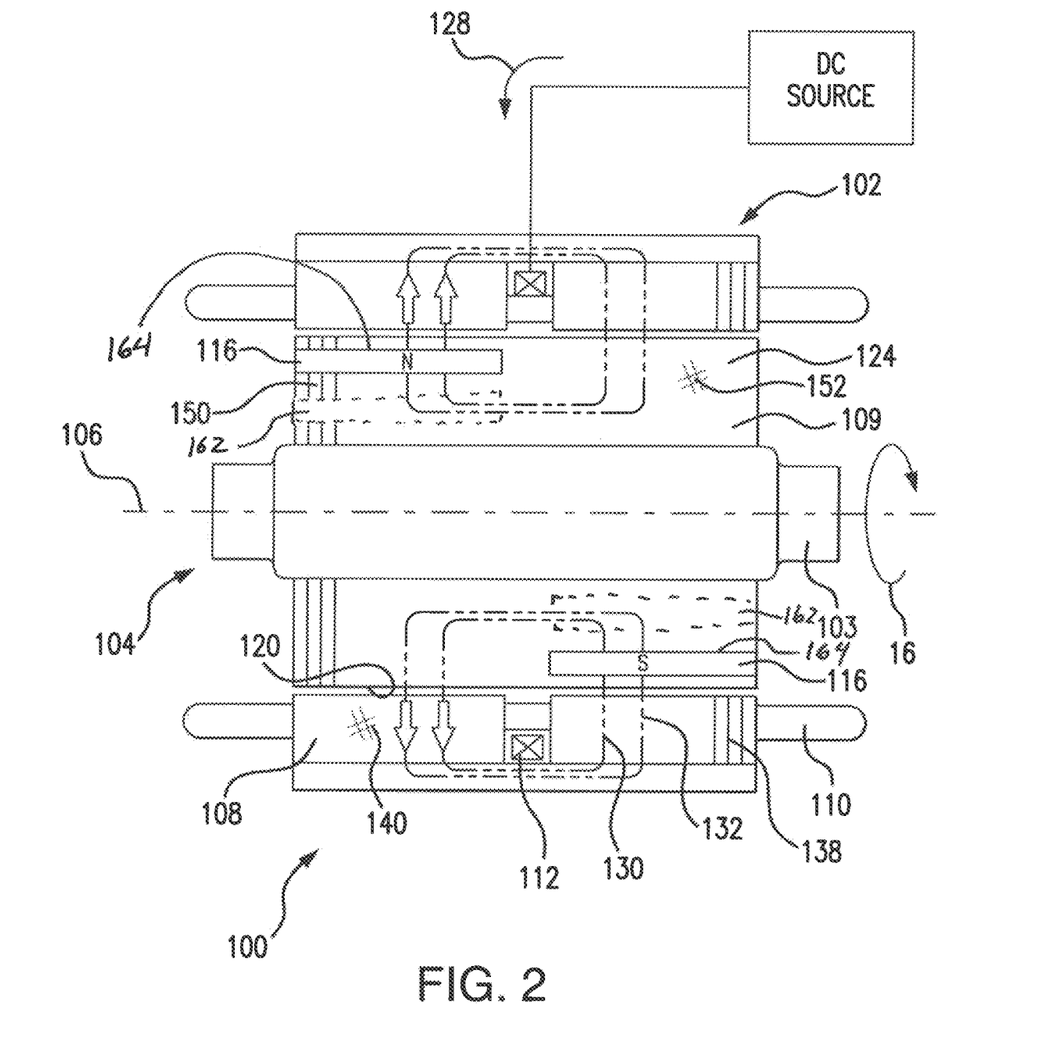
FIG. 2 is a longitudinal section view of the synchronous machine of FIG. 1, showing magnetic flux communicated between rotor-mounted permanent magnets and a stator AC winding being reduced/magnified by flux generated by a stator-mounted DC field winding.

With reference to FIG. 2, synchronous machine 100 is shown. Synchronous machine 100 includes a stator 102 and a rotor 104. Stator 102 is arranged along a rotation axis 106 and includes a ferromagnetic body 108, a stator AC winding 110, and a direct current control coil 112. Ferromagnetic body 108 includes a plurality of steel sheet members 138 stacked along rotation axis 106 and laminated to one another or a soft magnetic composite (SMC) material 140. Stator AC winding 110 is seated within stator 102, axially spans rotor 104, and is electrically connected to electrical system 10 (shown if FIG. 1) to provide AC power thereto.

Control coil 112 is seated within stator 102 at an axial location overlapping rotor 104 and is electrically connected to a DC source. Control coil 112 extends circumferentially about stator AC winding 110 and rotor 104 and is arranged at a location radially outward of stator AC winding 110. As will be appreciated by those of skill in the art in view of the present disclosure, employment of control coil 112 in the illustrated arrangement provides control of magnetic flux communicated between the rotor and stator of synchronous machine 100 without the need to transfer excitation power to rotor 104. This simplifies the construction of synchronous machine 100 by eliminating the need for brushes, slip rings, brushless exciters and/or rotating transformers to communicate power between stationary and rotation components of synchronous machine 100. It also allows for magnetic flux control with low amounts of power for excitation, reducing losses otherwise associated in wound rotor synchronous machines. In the illustrated exemplary embodiment control coil 112 is located at an axial location equally spaced between opposite ends of rotor 104.

Rotor 104 is supported for rotation about rotation axis 106 relative to stator 102 by a shaft 103 and includes a ferromagnetic body 109, a plurality of permanent magnet (PM) poles 116, and a plurality of PM-less poles 124. Ferromagnetic body 109 has a radially outer surface 120 that extends circumferentially about rotation axis 106. In certain embodiments ferromagnetic body 109 includes a plurality of steel sheet members 150 stacked along rotation axis 106 and laminated to one another. In accordance with certain embodiments ferromagnetic body 109 includes a soft magnetic composite (SMC) material 152. It is contemplated that rotor 104 be sleeveless, rotor 104 not requiring a sleeve to retain PMs 126 (shown in FIG. 3) during rotor rotation. It is contemplated that surface 120 extend continuously about rotation axis 106, thereby defining a sleeveless ferromagnetic surface bounding a gap between the stator portion and rotor portion of synchronous machine 100.

Figure 3:
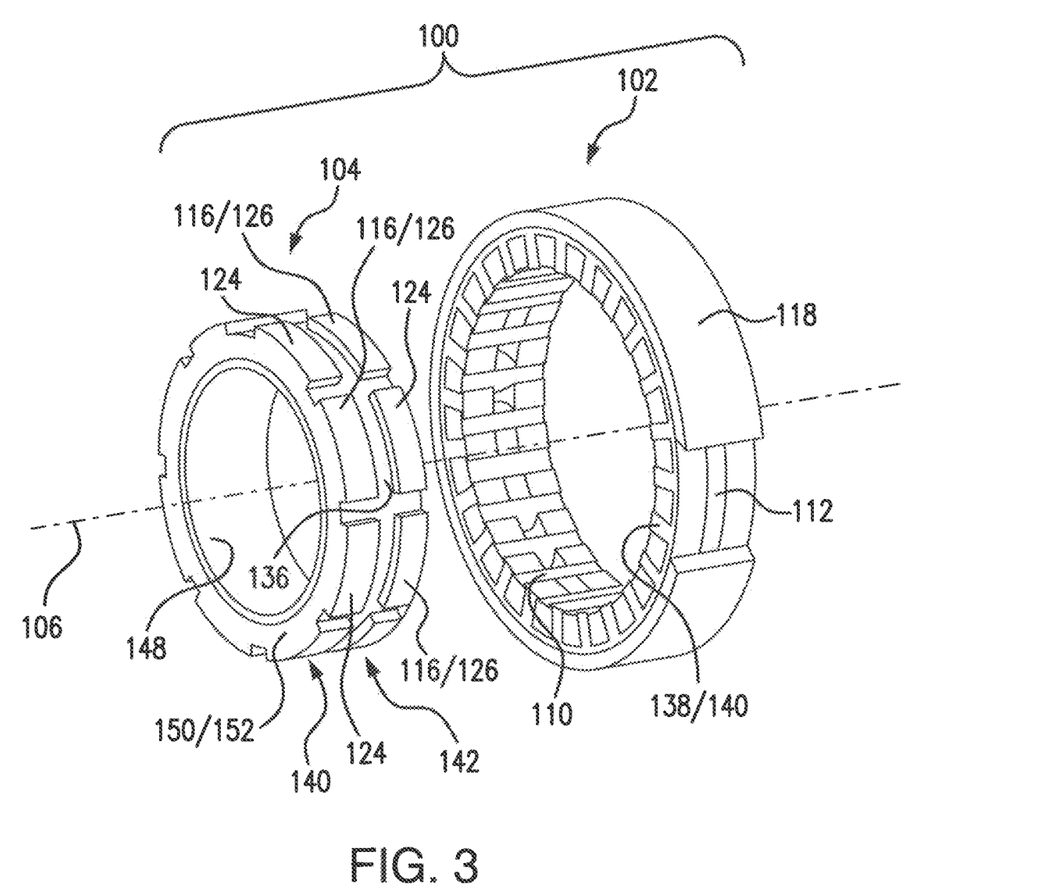
FIG. 3 is an exploded view of the synchronous machine of FIG. 1, showing the magnetic poles distributed circumferentially about and axially along the synchronous machine rotor.

With reference to FIG. 3, synchronous machine 100 is shown in an exploded view with surface 120 removed to show PMs 126, which are embedded within ferromagnetic body 109 (shown in FIG. 2). PM poles 116 have one or more PM 126. PM-less poles 124 do not include PMs and are formed entirely from a ferromagnetic material, e.g., sheet members 150 (shown in FIG. 2) or SMC material 152 (shown in FIG. 2). PM poles 116 and PM-less poles 124 are distributed circumferentially about rotation axis 106 in a circumferentially alternating arrangement, i.e. circumferentially adjacent PM poles 116 being separated by a PM-less pole 124. PM poles 116 and PM-less poles 124 are also distributed axially along rotation axis 106 in an alternating arrangement, i.e., each PM poles 116 axially overlapping a PM-less pole 124 and each PM-less pole 124 axially overlapping a PM pole 116.

With continuing reference to FIG. 2, it is contemplated that synchronous machine 100 provide power with constant output voltage under conditions where either or both electrical load and/or rotational speed of rotor 104 vary. The constant output voltage is provided by regulation of magnetic flux communicated between rotor 104 and stator 102. In particular, persistent magnetic flux 132 generated by PMs 126 (shown in FIG. 3) is reduced (or magnified) by control magnetic flux 130 generated by control coil 112. Magnitude of control magnetic flux 130 is controlled by direct current applied to control coil 112. Reduction (or magnification) of the flux is determined by polarity of control current applied to control coil 112. For example, when direct current 128 flows in a first direction through control coil 112, control magnetic flux 130 reduces persistent magnetic flux 132, compensating for change in rotational speed and/or load that would otherwise reduce output voltage of synchronous machine 100. Oppositely, when direct current 128 flows in an opposite second direction through control coil 112, control magnetic flux 130 magnifies persistent magnetic flux 132. The interaction of control magnetic flux 130 and persistent magnetic flux 132 for constant output voltage while rotational speed and/or load vary can be, for example, as described in U.S. Pat. No. 5,682,073 to Mizuno, the contents of which are incorporated herein by reference in its entirety.

Referring again to FIG. 3, stator 102 is divided into two axially opposite stator segments which seat alternating stator AC winding 110. Stator AC winding 110 is seated within slots defined between circumferentially adjacent teeth arranged on a radially inner surface of stator 102 and extends in parallel with rotation axis 106. Control coil 112 is seated within stator 102 at a location radially outward of armature winding 110, extends circumferentially about rotation axis 106 at a location radially outward of non-pole segment 136 of rotor 104, and divides stator 102 into two axially-opposite stator segments. A first row 140 of poles and a parallel second row 142 of poles are arranged within rotor 104 on axially opposite sides of control coil 112. As such, first and second magnetic flux barriers contained within PM-containing poles 116, e.g., a first magnetic flux barrier 162 (shown in FIG. 4) and second magnetic flux barrier 164 (shown in FIG. 4), span less than half an axial length of ferromagnetic body 109. As will be appreciated by those of skill in the art, a magnetic flux barrier is structure or discontinuity within ferromagnetic body 109 with greater reluctance than the ferromagnetic material forming the ferromagnetic body.

Because persistent magnetic flux 132 (shown in FIG. 2) produced by PMs 126 and control magnetic flux 130 (shown in FIG. 2) generated by control coil 112 have an axial direction, stator 102 is embraced by an annular outer core 118, Outer core 118 can be formed from solid steel or any other suitable ferromagnetic material. Otherwise, persistent magnetic flux 132 would have to penetrate perpendicular to ferromagnetic body 109, e.g., perpendicular to sheet members 150 or SMC material 152. As will be appreciated by those of skill in the art in view of the present disclosure, the axial flux 130 produced by control coil 112 reduces persistent magnetic flux 132 generated by PMs 126 when flowed in a first direction through control coil 112, and magnifies persistent magnetic flux 132 generated by PMs 126 when flow direction is reversed, e.g., by reversing polarity of voltage applied to control coil 112. In the illustrated exemplary embodiment, rotor 104 has an annular inner core 148. Because the magnetic flux of rotor 104 is constant, annular inner core 148 can be formed from solid steel, reducing the cost of synchronous machine 100.

Figure 4:
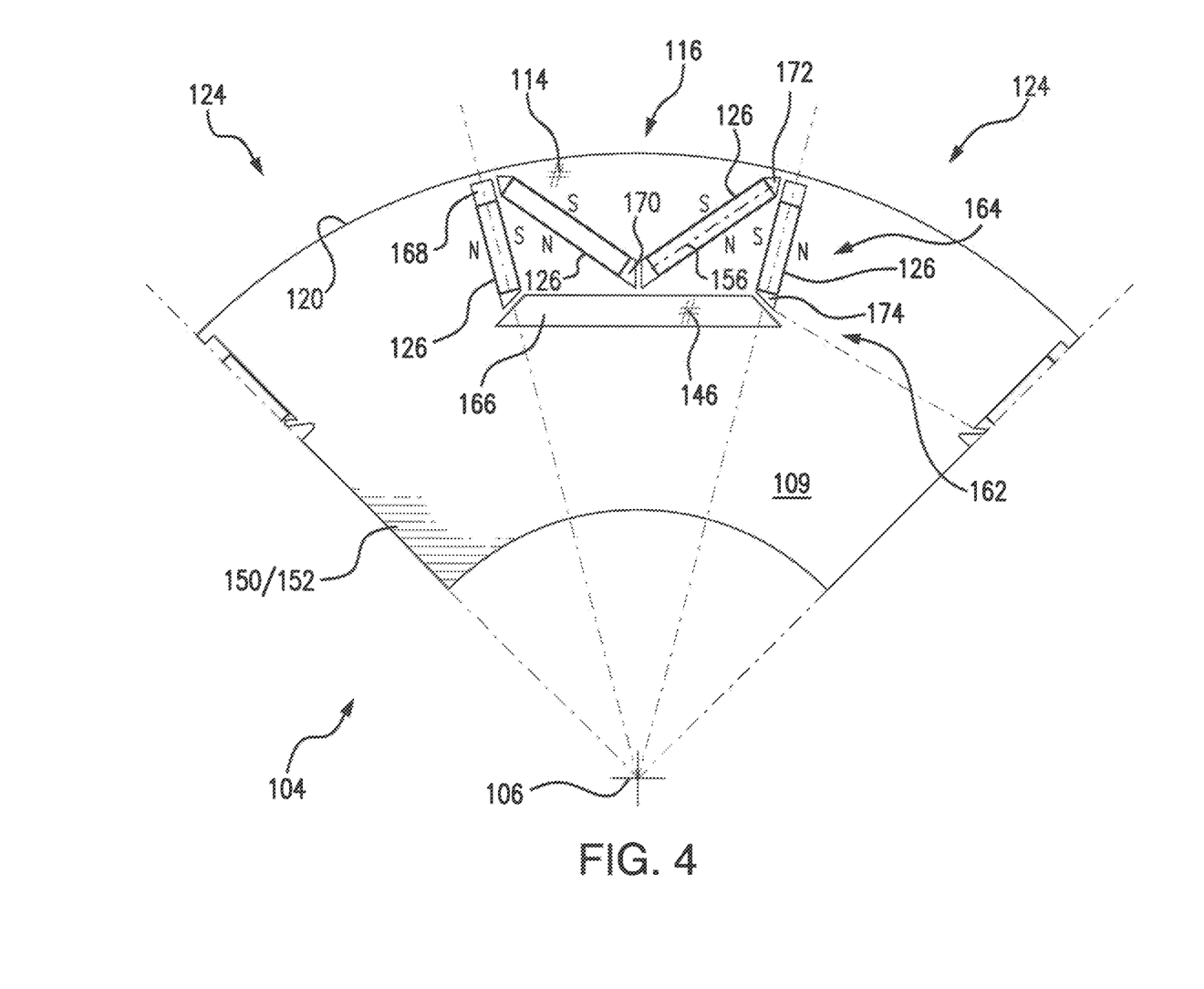
FIGS. 4-7 are lateral section views of the rotor of FIG. 3, showing the arrangement of magnetic flux barriers in magnetic poles of the synchronous machine rotor.

With reference to FIG. 4, rotor 104 is shown according to a first embodiment. Exemplary PM pole 116 (shown in FIG. 2) is interposed between circumferentially adjacent PM-less poles 124 and includes a first magnetic flux barrier 162 and a second magnetic flux barrier 164. First magnetic flux barrier 162 is arranged radially between rotation axis 106 and surface 120 of ferromagnetic body 109, and includes an axially extending first slot 166. Second magnetic flux barrier 164 is arranged radially between first magnetic flux barrier 162 and surface 120, radially overlaps first magnetic flux barrier 162, and includes at least one axially extending slot, e.g., a second slot 168, containing a PM 126. As will be appreciated by those of skill in the art in view of the present disclosure, first magnetic flux barrier 162 and second magnetic flux barrier 164 less readily allow magnetic flux to traverse their respective structures than the ferromagnetic material forming rotor 104. In certain embodiments, first magnetic flux barrier 162 presenting more resistance to magnetic flux communicated thereto than second magnetic flux barrier 164.

First magnetic flux barrier 162 is radially overlapped by second magnetic flux barrier 164 and includes first slot 166. First slot 166 is either empty or at least partially occupied by a non-ferromagnetic material 146 to direct magnetic flux from PM(s) 126 of second magnetic flux barrier 164 toward stator 102 (shown in FIG. 2). Non-ferromagnetic material 146 can include a resin of polymer material or aluminum by non-limiting example, which advantageously provides structural robustness to rotor 104 while carrying centrifugal loads during rotation of rotor 104.

Second magnetic flux barrier 164 includes a plurality of axial slots, i.e., second slot 168, a third slot 170, a fourth slot 172, and fifth slot 174 each containing a PM 126. In the illustrated exemplary embodiment second magnetic flux barrier 164 includes four PMs 126, each seated within a respective axial slot, e.g., second slot 168, third slot 170, fourth slot 172, and fifth slot 174. Each of PMs 126 has a rectangular axial profile with a major dimension 156. One or more of the PMs 126 is arranged such that the axial profile major dimension extends radially between rotation axis 106 and surface 120. One or more of the PMs 126 is arranged such that the axial profile major dimension extends with both a radial component and a tangential component between rotation axis 106 and surface 120. It is contemplated that the axial profile major dimensions of PMs 126 can be oblique relative to one another.

A ferromagnetic material 114 forming ferromagnetic body 109 bounds the plurality of axial slots defined within ferromagnetic body 109. It is contemplated that first magnetic flux barrier 162 and second magnetic flux barrier 164 be contained within the axial slots defined within an interior of rotor 109 such that the PMs are wholly embedded within the ferromagnetic material forming rotor 109. Further, ferromagnetic material 114 of ferromagnetic body 109 radially encapsulates the one or more of the plurality of axial slots of second magnetic flux barrier 164 and extends radially outward thereof to surface 120. This construction allows ferromagnetic material 114 of ferromagnetic body 109 to opposes the centrifugal force exerted on the PM(s) 126 during rotation of rotor 104, eliminating the need for a rotor sleeve. Further, as the rotor 104 is sleeveless, the PM(s) 126 can be volumetrically smaller for a given magnetic flux regulation owing to the reduced non-ferromagnetic gap between rotor 104 and stator 104 (shown in FIG. 2) otherwise associated with a non-ferromagnetic rotor sleeve.

Figure 5:
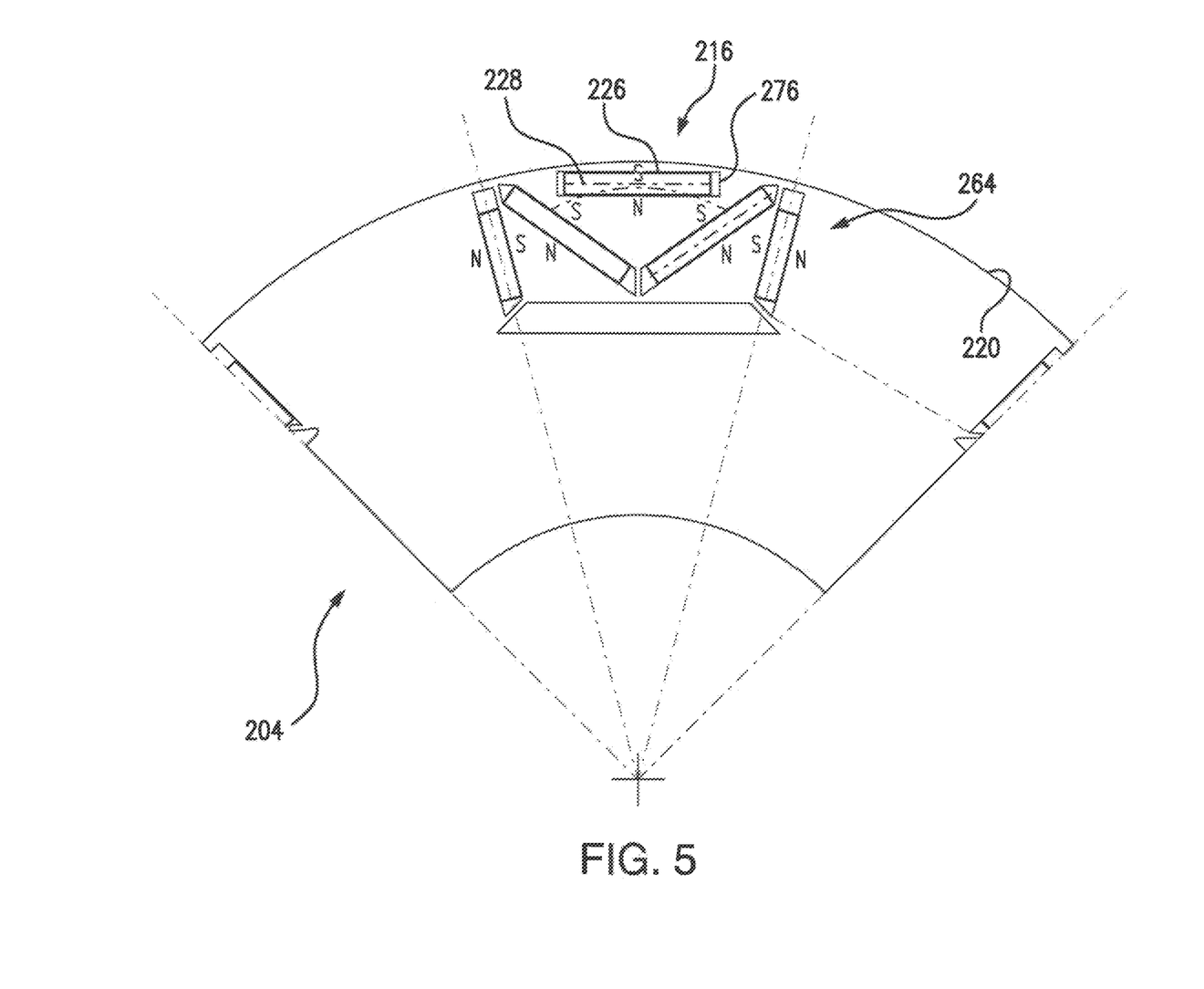

With reference to FIG. 5, a rotor 204 is shown according to a second exemplary embodiment. Rotor 204 is similar to rotor 104 and additionally includes a PM pole 216 with a second magnetic flux barrier 264. Second magnetic flux barrier 264 includes a sixth slot 276. Sixth slot 276 contains a PM 226 arranged proximate to surface 220 and having an axial profile with an axial profile major dimension 228. Axial profile major dimension 228 is arranged tangentially relative to an internal circumference of rotor 204 and is proximate surface 220. PM 226 provides radial magnetization for additional magnetic flux generation from PM pole 216, increasing the electrical power output capability of synchronous machines, e.g. synchronous machine 100 (shown in FIG. 1), employing rotor 204.

Figure 6:
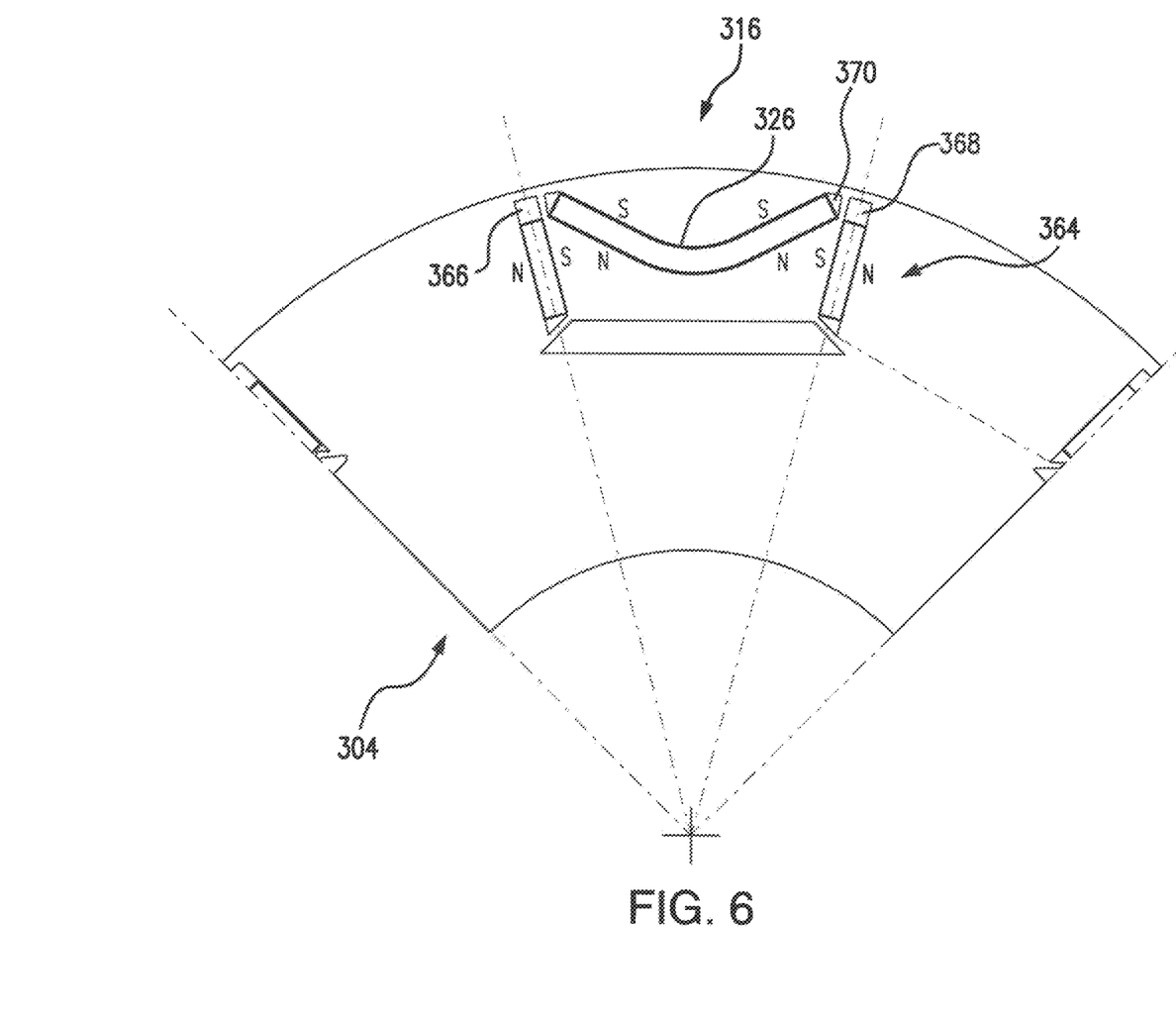

With reference to FIG. 6, a rotor 304 is shown according to a third exemplary embodiment. Rotor 304 is similar to rotor 104 and additionally includes a second magnetic flux barrier 364. Second magnetic flux barrier includes a third slot 370 with an arcuate profile, i.e., an axial profile with an arcuate shape, arranged circumferentially between a first slot 366 and a second slot 368. Third slot 370 has a PM 326 with an arcuate profile conforming to an arcuate profile of third slot 370. The arcuate profile of PM 326 stabilizes PM 326 relative to third slot 370 from lateral forces associated with rotational acceleration and deceleration of rotor 304. The arcuate profile of PM 326 also allows for the use of a larger PM, increasing magnetic flux of PM pole 316 without increasing the number of parts incorporated in rotor 304. As will be appreciated by those of skill in the art in view of the present disclosure, this can simplify the fabrication of rotor 304.

Figure 7:
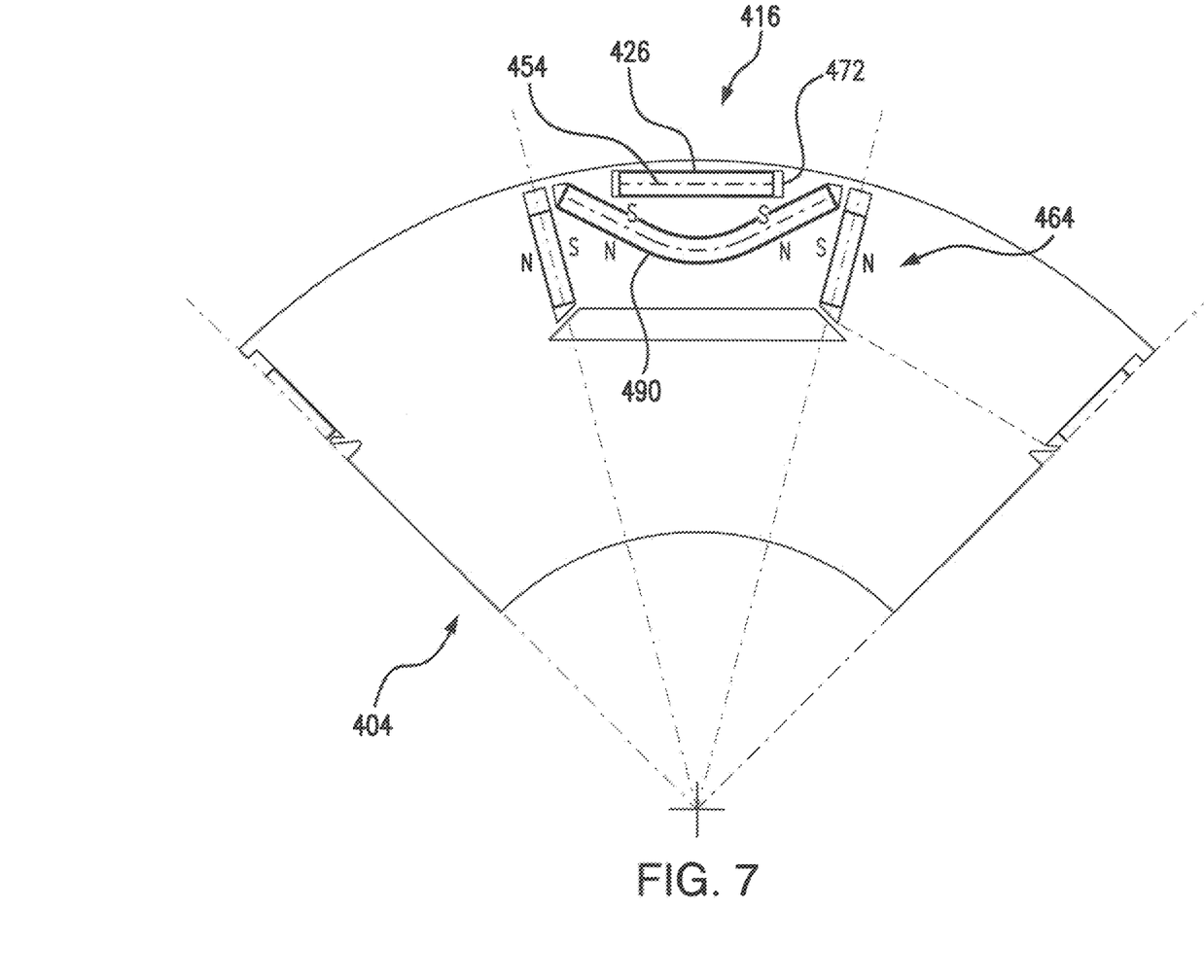

With reference to FIG. 7, a rotor 404 is shown according to a fourth embodiment. Rotor 404 is similar to rotor 304 and additionally includes a PM pole 416 with a second magnetic flux barrier 464. Second magnetic flux barrier 464 has a fourth slot 472. Fourth slot 472 contains a PM 426 with an axial profile having an axial profile major dimension 454. Axial profile major dimension 454 is arranged tangentially relative to an internal circumference of rotor 404 and radially overlaps slot 490 having an arcuate profile. Inclusion of fourth PM 426 increases magnetic flux generated by PM pole 422. As with PM 226 (shown in FIG. 6), PM 426 is magnetized radially.

Figure 8:
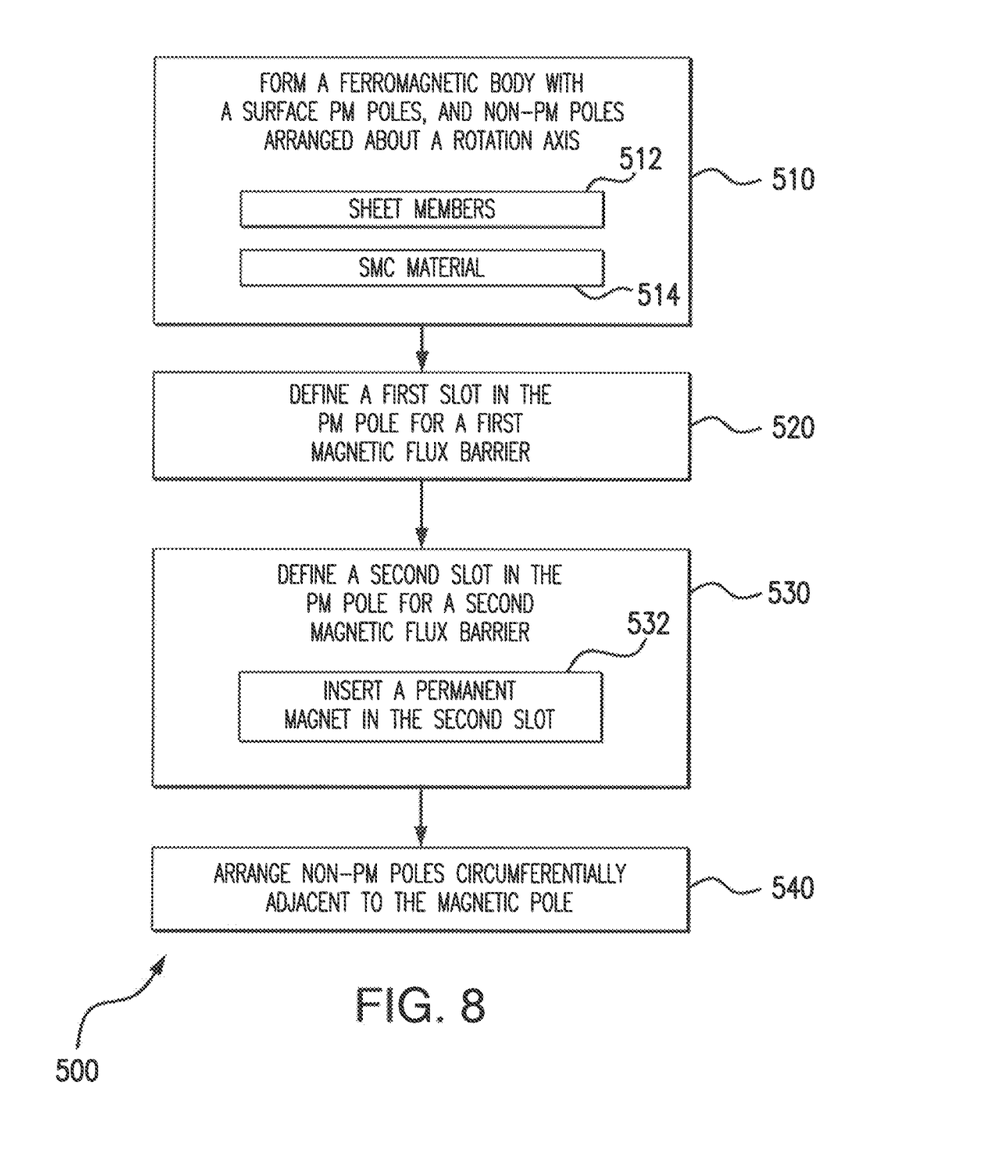
FIG. 8 is a process flow diagram of a method of making a rotor, showing steps of the method.

With reference to FIG. 8, a method 500 of making a rotor for a hybrid synchronous machine is shown, e.g., rotor 104 (shown in FIG. 2) of synchronous machine 100 (shown in FIG. 2). Method 500 includes forming a ferromagnetic body, e.g., ferromagnetic body 109 (shown in FIG. 2) with a surface and magnetic poles, e.g., PM pole 116 (shown in FIG. 2) and non-PM pole 124 (shown in FIG. 2) arranged about a rotation axis, as shown with box 510. A first slot, e.g., first slot 166 (shown in FIG. 4) is defined in the PM pole between the surface and the rotation axis for a first magnetic flux barrier, e.g., first magnetic flux barrier 162 (shown in FIG. 4), as shown with box 520. A second slot, e.g. second slot 168 (shown in FIG. 4), is defined in the PM pole between the first slot and the surface the ferromagnetic body for a second magnetic flux barrier, e.g., second magnetic flux barrier 164 (shown in FIG. 4), as shown with box 530. A PM, e.g., PM 126 (shown in FIG. 4), is inserted in the second slot such that it is embedded within the ferromagnetic material of the rotor, as shown with box 532.

In certain embodiments the ferromagnetic body is formed from a plurality of sheet members, e.g., sheet members 150 (shown in FIG. 2), stacked along the rotation axis and laminated together, as shown with box 512. In accordance with certain embodiments the ferromagnetic body can be formed from an SMC material, e.g., SMC material 152 (shown in FIG. 2). It is contemplated that the non-PM poles can be formed circumferentially adjacent to the PM pole, as shown with box 540. The first slot can be empty. The first slot can receive a non-magnetic material, such as a resin or an aluminum insert.

Synchronous machines are commonly used to generate electrical power using wound-field or PM rotors. Wound-field rotors generally carry excitation windings. The excitation windings typically receive an excitation current, which produces magnetic flux for communication with the stator. PM rotors generally carry PMs for generating a persistent magnetic field. In constant output voltage application where rotor speed is variable and/or electrical load variable, it can be necessary to control the magnetic flux in the gap between the rotor and stator. In wound-field rotor machines this is generally done by controlling the amount of excitation current communicated to the rotor. Flux control in PM rotor machines is typically accomplished by application of a d-axis stator (armature) current from a power converter. While each is generally satisfactory for its intended purpose, wound-field rotors typically have efficiency losses due to the need to communicate power across the stator/rotor gap while PM rotor machines can require relatively complex power converters to control the stator (armature) current.

In embodiments described herein PM rotor synchronous machines with hybrid excitation are described. The PM rotor requires no excitation current, avoiding the efficiency losses that typically accompany wound-field rotors and further voiding additional devices such as slip rings, brushes, brushless exciters, and/or rotary transformers. The control coil receives direct current which is controllable with a voltage chopper, avoiding the need for relatively complex power control electronics. In certain embodiments, PM rotors are provided which are sleeveless. Sleeveless rotor arrangements can simplify manufacture of the rotor reducing parts and assembly steps. Sleeveless rotor arrangements can also reduce the size of the PMs required to generate a given amount of flux for a given magnetic material, allowing the synchronous machine itself to be relatively compact.

In accordance with certain embodiments, the rotor surface can be defined by steel sheet members containing within their interior PMs, thereby providing protection to the PMs against centrifugal stresses and eliminating the need for a compress-fit retaining sleeve to prevent rupture. It is also contemplated that the rotor arrangement can protect the PMs from demagnetization by the stator magnetic flux.

The methods and systems of the present disclosure, as described above and shown in the drawings, provide for synchronous machines with superior properties including a sleeveless core arrangement, reducing cost and size of the synchronous machine. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A rotor comprising a ferromagnetic body with embedded permanent magnets (PMs) embedded within an interior of the ferromagnetic body, wherein the ferromagnetic body comprises:

a surface;

a plurality of magnetic poles, wherein each of the magnetic poles includes one or more of the embedded PMs; and a plurality of PM-less poles, wherein each of the PM-less poles does not include PMs and is entirely formed from a ferromagnetic material, wherein the plurality of magnetic poles and the plurality of PM-less poles are distributed circumferentially about a rotation axis such that circumferentially adjacent magnetic poles are separated by a PM-less pole of the plurality of PM-less poles, wherein the plurality of magnetic poles and the plurality PM-less poles are axially distributed along the rotation axis such that each magnetic pole axially overlaps a PM-less pole, and each PM-less pole axially overlaps a magnetic pole, wherein at least one of the magnetic poles includes a first magnetic flux barrier and a second magnetic flux barrier, the first magnetic flux barrier being arranged radially between the rotation axis and the surface of the ferromagnetic body, and the second magnetic flux barrier being arranged radially between the first magnetic flux barrier and the surface of the ferromagnetic body, wherein the first magnetic flux barrier includes an axially extending slot defined within an interior of the ferromagnetic body, wherein the second magnetic flux barrier includes one or more of the PMs, wherein the PM has an axial profile major dimension arranged radially between the rotation axis and the surface of the ferromagnetic body, and wherein due to the circumferentially alternating arrangement of the magnetic poles and PM-less poles, each PM having its axial profile major dimension arranged radially between the rotation axis and the surface of the ferromagnetic body is spaced relative to a PM of a different magnetic pole by a PM-less pole so that a circumferentially-facing pole is spaced from a PM of a different pole by a PM-less pole for reducing interaction between magnetic fields in a circumferential direction.

2. The rotor as recited in claim 1, wherein the first and second magnetic flux barriers span less than half an axial length of the ferromagnetic body.

3. The rotor as recited in claim 1, wherein the PM has an axial profile major dimension arranged tangentially between the rotation axis and an internal circumference of the ferromagnetic body.

4. The rotor as recited in claim 1, wherein the PM has an axial profile major dimension arranged both tangentially and radially between the rotation axis and the surface of the ferromagnetic body.

5. The rotor as recited in claim 1, wherein the PM has an arcuate profile.

6. The rotor as recited in claim 1, wherein the first magnetic flux barrier and second magnetic flux barrier are arranged within axially extending slots and are bounded by a ferromagnetic material.

7. The rotor as recited in claim 6, wherein a slot of the second magnetic flux barrier radially overlaps a slot of the first magnetic flux barrier.

8. The rotor as recited in claim 6, wherein the slot of the first magnetic barrier does not contain a PM.

9. The rotor as recited in claim 6, wherein the slot of the second magnetic flux barrier contains a PM.

10. The rotor as recited in claim 6, wherein the first magnetic flux barrier slot is empty.

11. The rotor as recited in claim 6, wherein the first magnetic flux barrier slot contains a non-magnetic material.

12. The rotor as recited in claim 1, wherein the rotor is a sleeveless rotor formed from a soft magnetic composite (SMC) material or a plurality of sheet members stacked along the rotation axis, wherein the surface of the ferromagnetic body is defined by the SMC material or the plurality of sheet members.

13. A synchronous machine, comprising:
a stator extending along a rotation axis; and
a rotor as recited in claim 1, wherein the first magnetic flux barrier and second magnetic flux barrier form a first magnetic pole, wherein the rotor includes a second magnetic pole circumferentially adjacent to the first magnetic pole and having no magnetic flux barriers.

14. The synchronous machine as recited in claim 13, wherein the first magnetic flux barrier is contained within an empty slot or a slot at partially occupied by a non-magnetic material.

15. The synchronous machine as recited in claim 13, wherein the stator includes a control coil extending about the rotor, wherein the first and second magnetic flux barriers are arranged on a common axial side of the control coil, wherein the first and second magnetic flux barriers axially overlap a pole without magnetic flux barriers arranged on a side of the control coil opposite the first and second magnetic flux barriers.

16. A method of making a rotor, comprising:
forming a ferromagnetic body with a surface, a plurality of magnetic poles, and a plurality of permanent magnet (PM)-less poles, wherein each of the magnetic poles includes one or more of the embedded PMs and each of the PM-less poles does not include PMs and is entirely formed from a ferromagnetic material;

arranging the magnetic poles and the PM-less poles to be distributed circumferentially about a rotation axis such that circumferentially adjacent magnetic poles are separated by a PM-less pole of the plurality of PM-less poles, and to be distributed axially along the rotation axis such that each magnetic pole axially overlaps a PM-less pole, and each PM-less pole axially overlaps a magnetic pole;

defining an axially extending first slot in a magnetic pole between the surface and the rotation axis for a first magnetic flux barrier;

defining an axially extending second slot with one or more PMs in the magnetic pole between the first slot and the surface the ferromagnetic body for a second magnetic flux barrier, wherein the one or more PMs have an axial profile major dimension arranged radially between the rotation axis and the surface of the ferromagnetic body, wherein due to the circumferentially alternating arrangement of the magnetic poles and PM-less poles, each PM having its axial profile major dimension arranged radially between the rotation axis and the surface of the ferromagnetic body is spaced relative to a PM of a different magnetic pole by a PM-less pole so that a circumferentially-facing pole is spaced from a PM of a different pole by a PM-less pole for reducing interaction between magnetic fields in a circumferential direction.

* * * * *